(12) United States Patent
Kim et al.

(10) Patent No.: US 8,319,924 B2
(45) Date of Patent: Nov. 27, 2012

(54) LIQUID CRYSTAL DISPLAY AND METHOD OF FABRICATING THE SAME

(75) Inventors: Jae-Sung Kim, Yongin-si (KR); Yang-Ho Jung, Yongin-si (KR); Hoon Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 495 days.

(21) Appl. No.: 12/563,301

(22) Filed: Sep. 21, 2009

(65) Prior Publication Data
US 2010/0091228 A1    Apr. 15, 2010

(30) Foreign Application Priority Data
Oct. 10, 2008    (KR) .................. 10-2008-0099757

(51) Int. Cl.
*G02F 1/1333* (2006.01)
*G02F 1/1343* (2006.01)

(52) U.S. Cl. .................. 349/122; 349/139; 349/187

(58) Field of Classification Search .................. 349/122, 349/141, 160, 187, 139
See application file for complete search history.

(56) References Cited

U.S. PATENT DOCUMENTS

| | | | |
|---|---|---|---|
| 2003/0183820 A1* | 10/2003 | Park et al. ........................ | 257/66 |
| 2005/0179847 A1* | 8/2005 | Miyachi et al. ................. | 349/141 |
| 2006/0038946 A1* | 2/2006 | Yoshida et al. ................. | 349/114 |
| 2006/0103792 A1* | 5/2006 | Lee et al. ........................ | 349/113 |

\* cited by examiner

*Primary Examiner* — Michael Caley
(74) *Attorney, Agent, or Firm* — Cantor Colburn LLP

(57) ABSTRACT

A liquid crystal display ("LCD") and a method of fabricating the same are provided. The LCD includes a first insulating substrate, protrusion patterns spaced apart from each other on the first insulating substrate, pixel electrodes disposed on the protrusion patterns and having a cutout between the protrusion patterns, metal patterns disposed on the protrusion patterns and overlapping top surfaces of the protrusion patterns, a second insulating substrate facing the first insulating substrate, and a liquid crystal layer interposed between the first insulating substrate and the second insulating substrate.

24 Claims, 13 Drawing Sheets

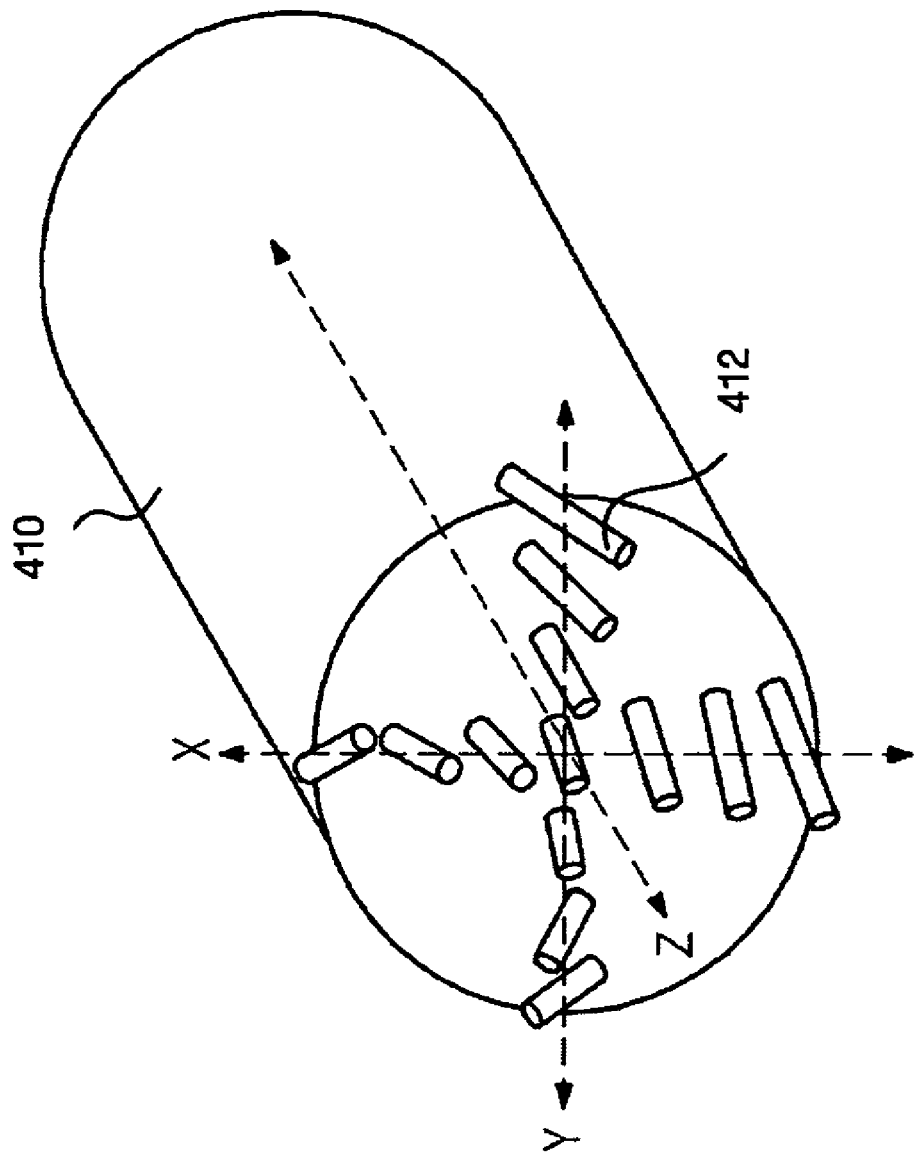

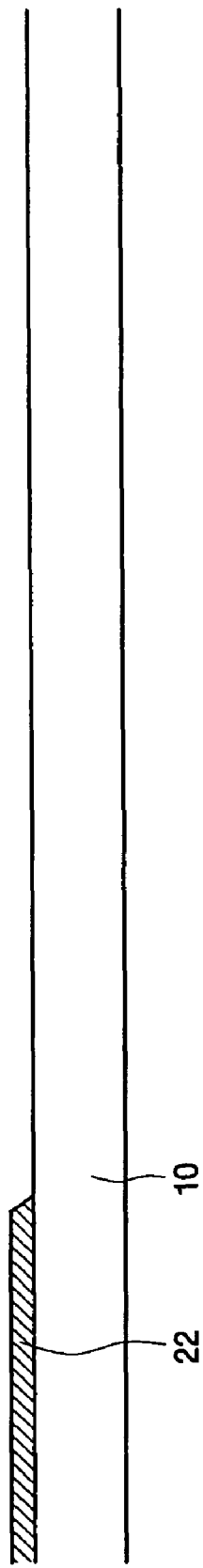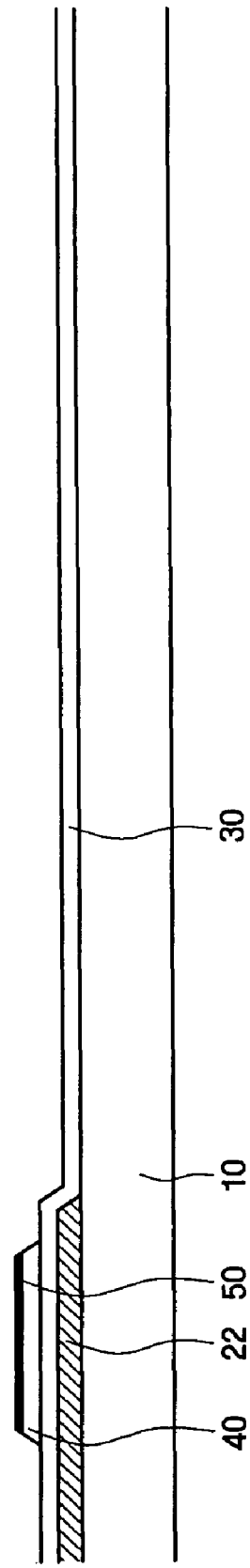

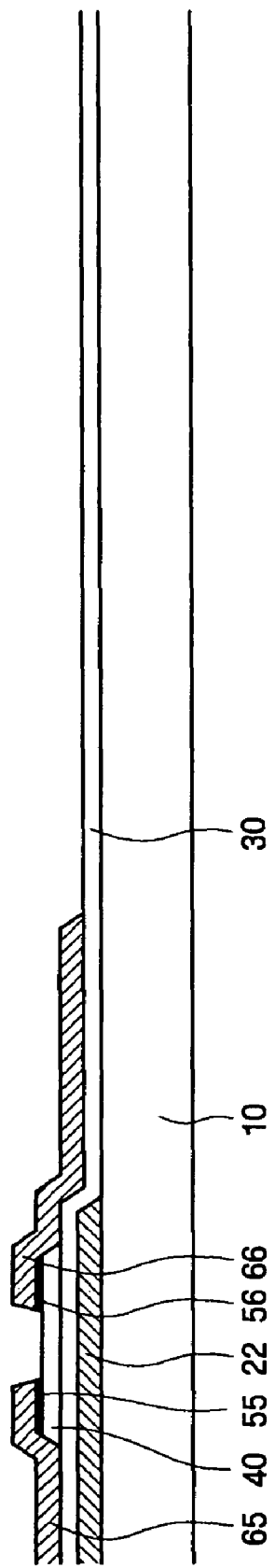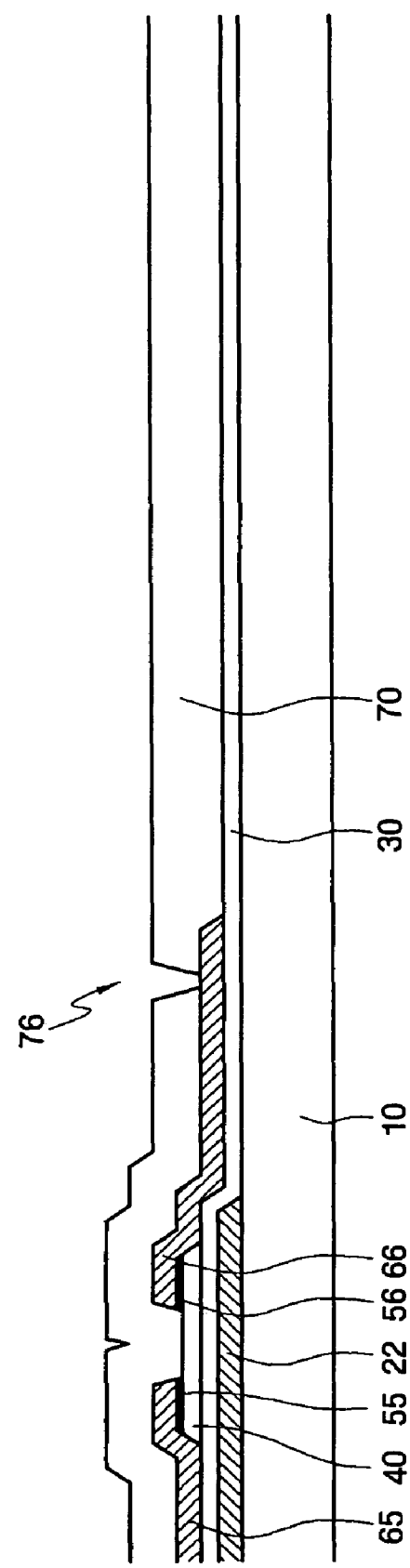

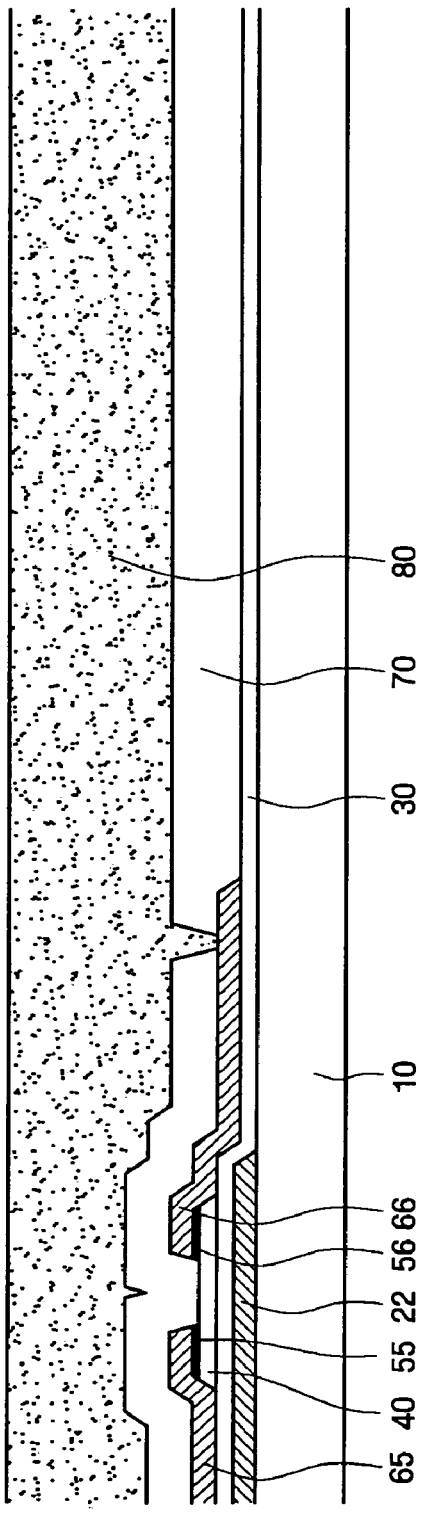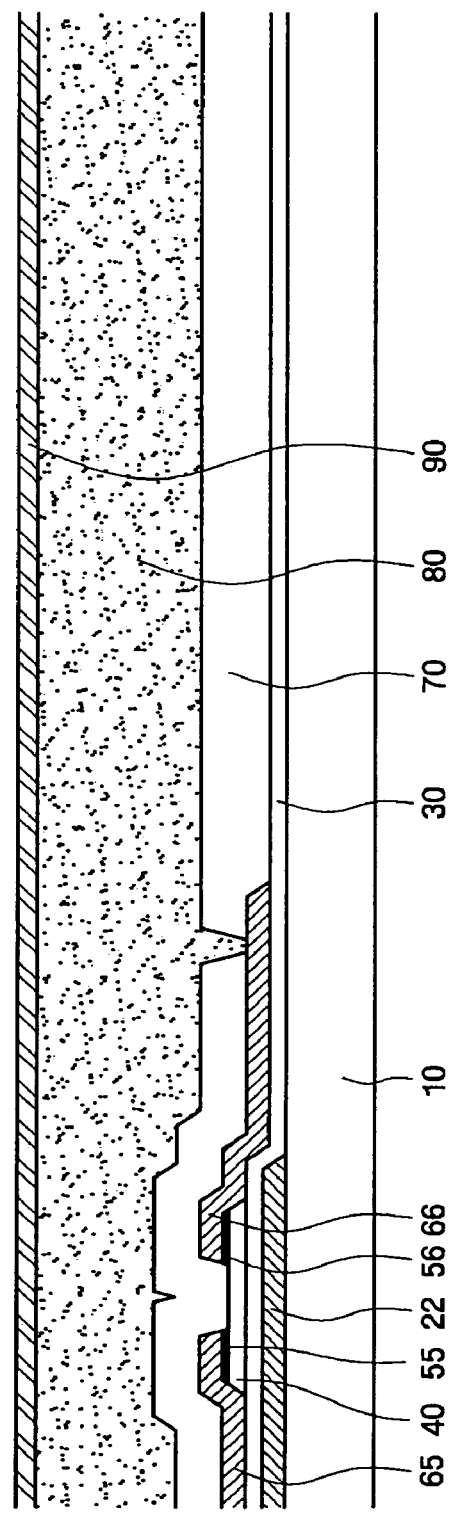

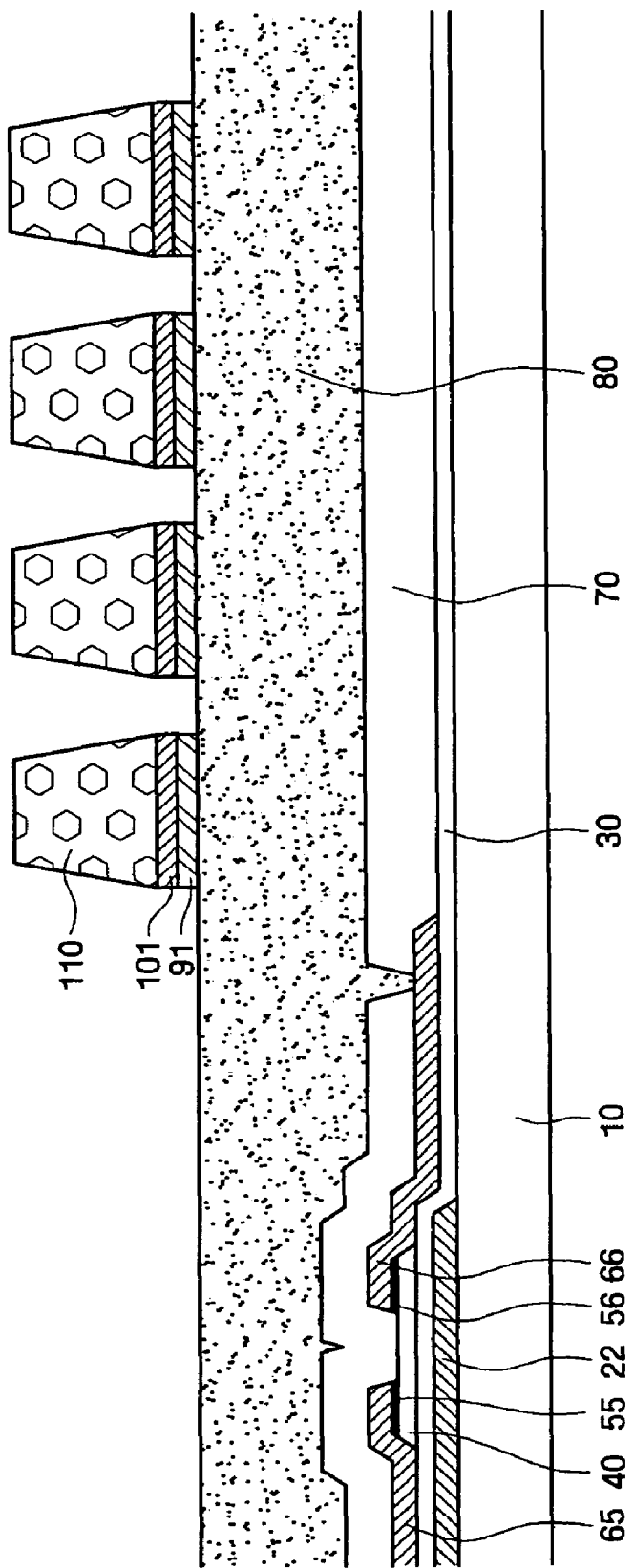

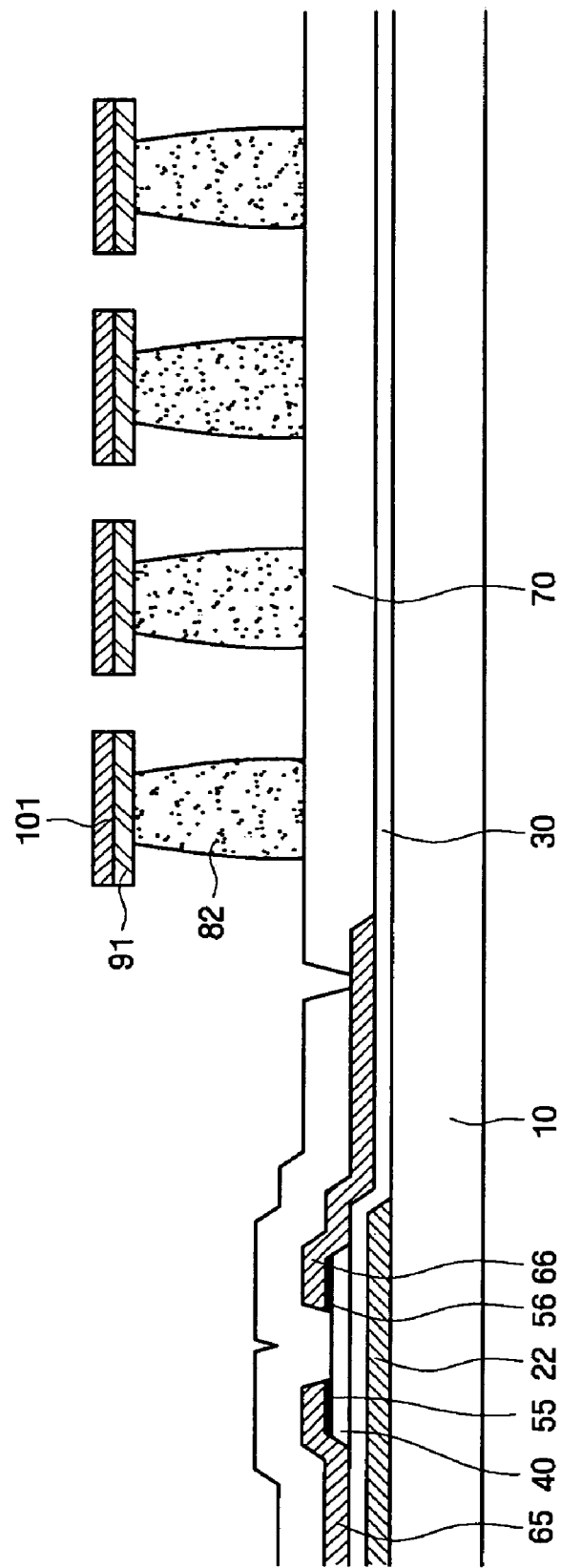

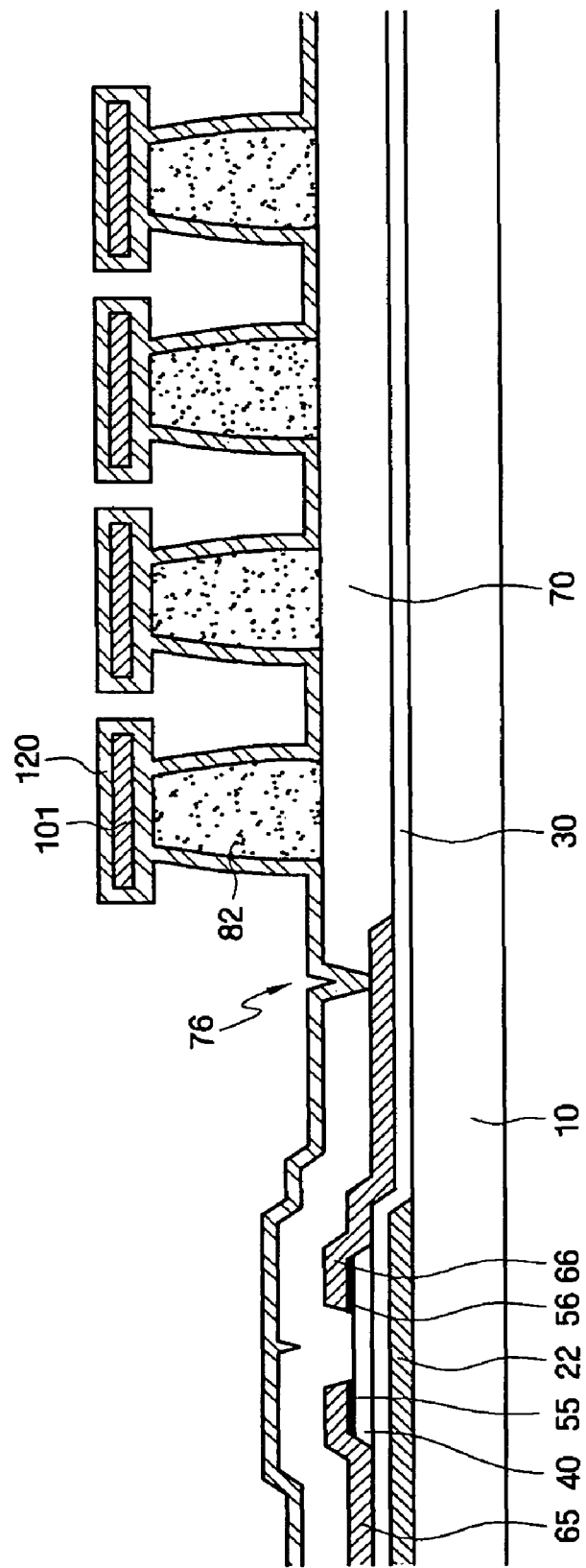

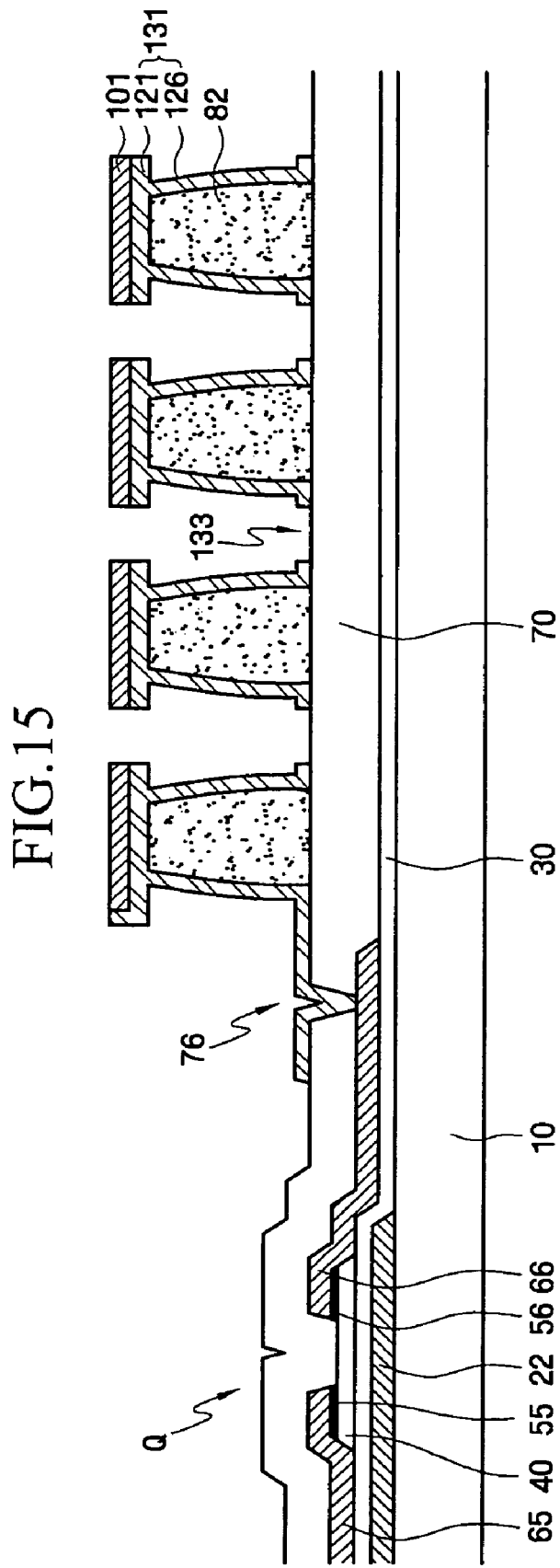

LIQUID CRYSTAL DISPLAY AND METHOD OF FABRICATING THE SAME

This application claims priority to Korean Patent Application No. 10-2008-0099757, filed on Oct. 10, 2008, and all the benefits accruing there from under 35 U.S.C. §119, the contents of which in its entirety are herein incorporated by reference.

BACKGROUND OF THE INVENTION

1. Field of the Invention

The present invention relates to a liquid crystal display ("LCD") and a method of fabricating the same, and more particularly, to an LCD capable of driving blue phase liquid crystal molecules and a method of fabricating the same.

2. Description of the Related Art

As modern society changes into an information-oriented society, market demand for display devices having a large-screen size and a slim profile is increasing. To overcome the disadvantages of conventional cathode ray tubes ("CRTs"), there is an explosively growing demand for flat display devices represented by a plasma display panel ("PDP") device, a plasma address liquid crystal ("PALC") device, a liquid crystal display ("LCD") device, an organic light emitting diode ("OLED") device, and so on. In particular, display devices have various advantages, including high definition ("HD"), miniaturization, lightweight, a slim profile, and so on, and are widely applied to a variety of electronic devices.

An LCD is one of the most widely used flat panel displays ("FPDs"), and it is composed of two display panels having a plurality of electrodes thereon and a liquid crystal layer interposed therebetween. When a voltage is applied to the electrodes, an electric field is generated between the electrodes of the two panels to control the transmittance of light passing through the liquid crystal layer by rearranging liquid crystal molecules to thereby display images.

However, the LCD has a poor viewing angle due to its orientation of liquid crystal, compared to other display devices. To overcome this disadvantage, an LCD using blue phase liquid crystals has been developed.

Since the LCD using blue phase liquid crystals has a high response speed and a wide viewing angle, it is currently receiving increased attention as a promising display device.

BRIEF SUMMARY OF THE INVENTION

It has been determined herein that a conventional liquid crystal display ("LCD") using blue phase liquid crystals disadvantageously requires a high driving voltage.

Accordingly, the present invention provides an LCD capable of driving blue phase liquid crystals with a reduced driving voltage.

The present invention also provides a method of fabricating an LCD capable of driving blue phase liquid crystals with a reduced driving voltage.

The above and other features of the present invention will be described in or be apparent from the following description of the exemplary embodiments.

According to an exemplary embodiment of the present invention, there is provided an LCD including a first insulating substrate, protrusion patterns spaced apart from each other on the first insulating substrate, pixel electrodes disposed on the protrusion patterns and having a cutout between the protrusion patterns, metal patterns disposed on the protrusion patterns and overlapping top surfaces of the protrusion patterns, a second insulating substrate facing the first insulating substrate, and a liquid crystal layer interposed between the first insulating substrate and the second insulating substrate.

According to another exemplary embodiment of the present invention, there is provided a method for fabricating an LCD, the method including disposing protrusion patterns spaced apart from each other on an insulating substrate, disposing pixel electrodes on the protrusion patterns and having a cutout between the protrusion patterns, and disposing metal patterns on the protrusion patterns and overlapping top surfaces of the protrusion patterns.

BRIEF DESCRIPTION OF THE DRAWINGS

The above and other features and advantages of the present invention will become more apparent by describing in detail exemplary embodiments thereof with reference to the attached drawings in which:

FIG. 3A is a view showing a structure of a blue-phase liquid crystal;

FIGS. 4 through 15 are cross-sectional views showing sequentially the process of an exemplary method of fabricating an exemplary LCD according to an exemplary embodiment of the present invention.

DETAILED DESCRIPTION OF THE INVENTION

Figure 1:
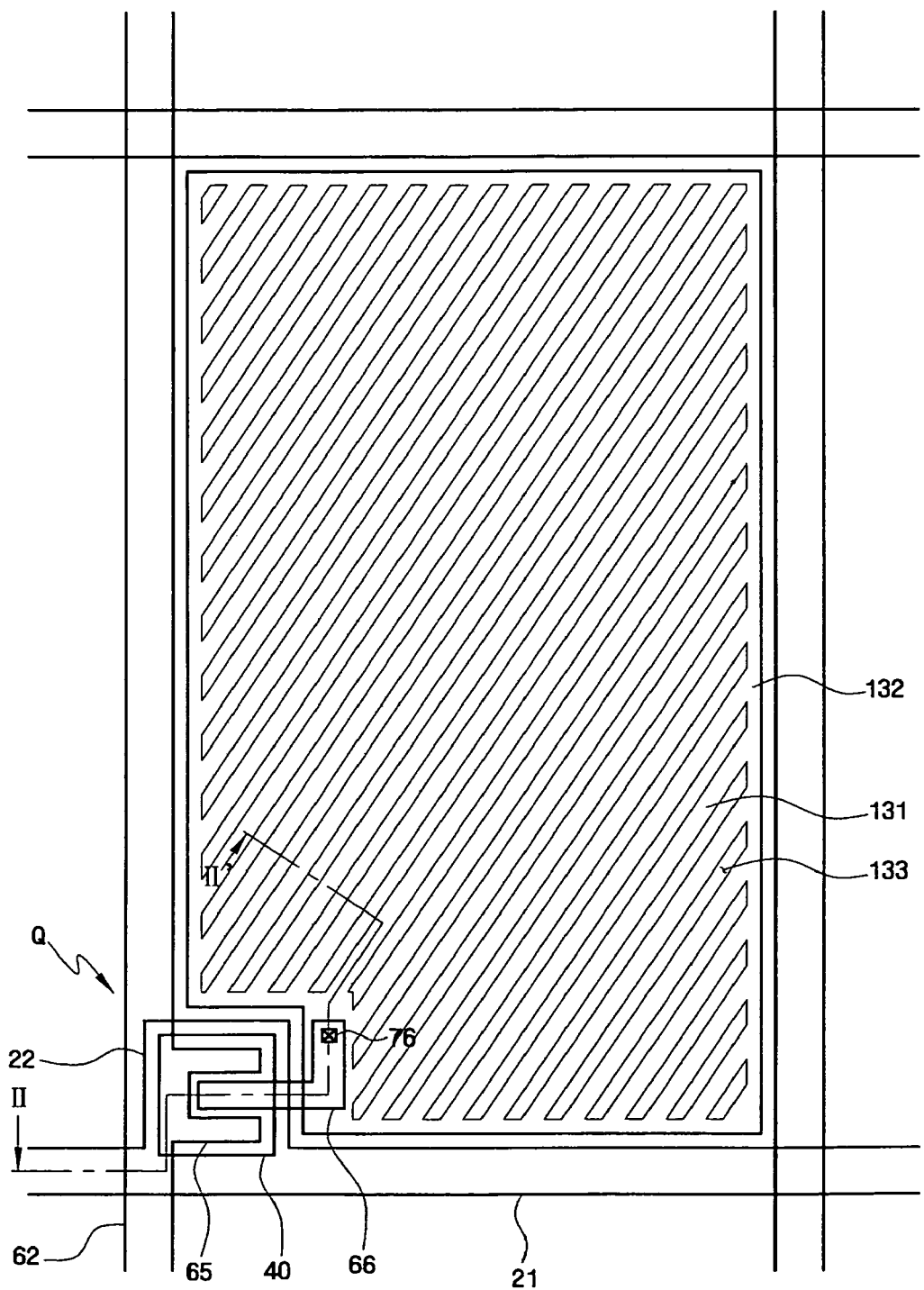
FIG. 1 is a layout view showing an exemplary liquid crystal display ("LCD") according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, a thin film transistor ("TFT") display panel according to an exemplary embodiment of the present invention is explained in detail with reference to FIGS. 1 through 3B. FIG. 1 is a layout view showing an exemplary liquid crystal display ("LCD") according to an exemplary embodiment of the present invention, FIG. 2 is a cross-sectional view of the exemplary LCD, taken along line II-II' of FIG. 1, FIG. 3A is a view showing a structure of a blue-phase liquid crystal, and FIG. 3B is a view showing a structure of an exemplary liquid crystal layer including a blue-phase liquid crystal.

Figure 2:
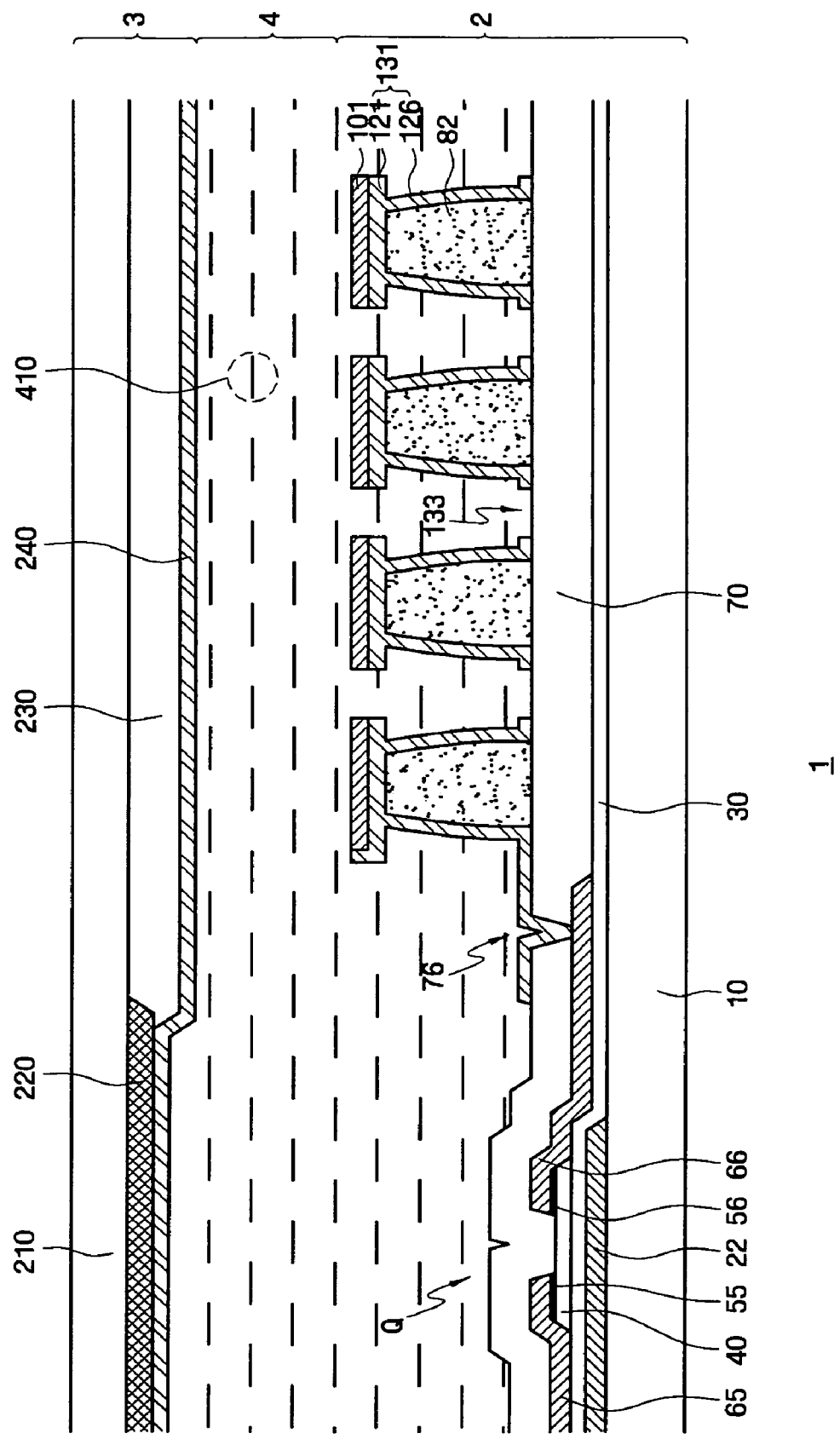
FIG. 2 is a cross-sectional view of the exemplary LCD, taken along line II-II' of FIG. 1.
Figure 3B:
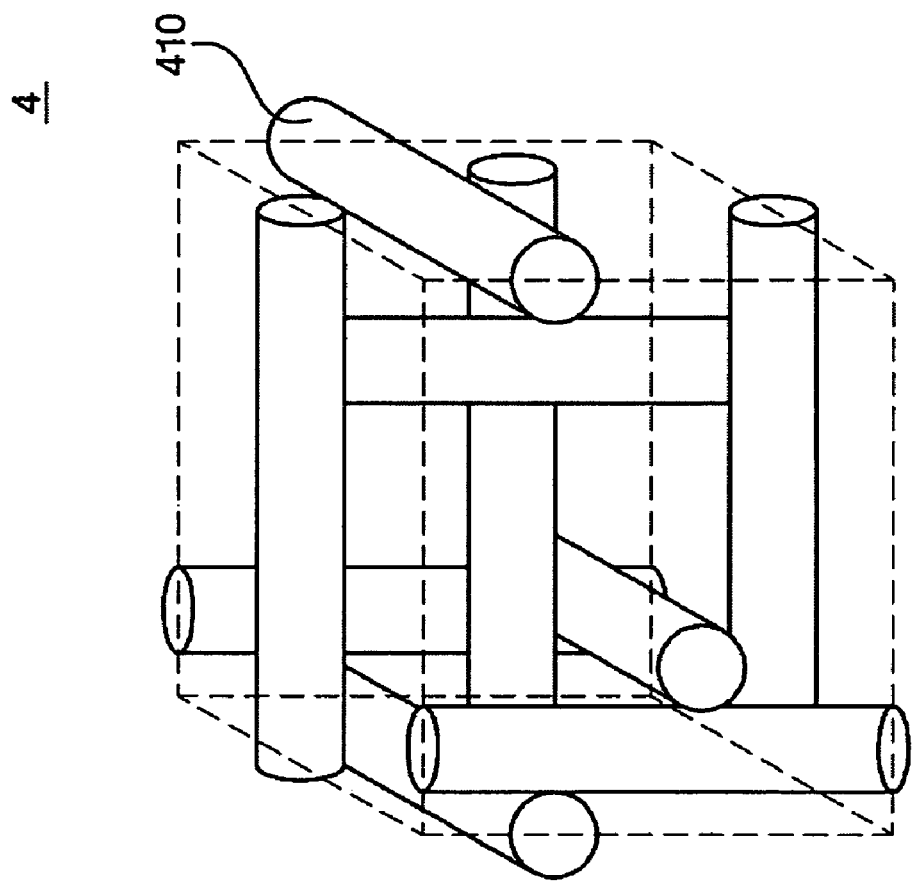
FIG. 3B is a view showing a structure of an exemplary liquid crystal layer including a blue-phase liquid crystal.

Referring to FIGS. 1 and 2, the LCD 1 includes a lower display panel 2 having a gate line 21, a data line 62, a pixel electrode 131 and a TFT Q, an upper display panel 3 facing the lower display panel 2 and having a common electrode 240 and color filters 230, and a liquid crystal layer 4 interposed between the lower display panel 2 and the upper display panel 3.

First, the lower display panel 2 will be described. The gate line 21 and a gate electrode 22 are formed, hereinafter disposed, on a first insulating substrate 10 made of a material such as transparent glass.

The gate line 21 extends in a transverse direction, a first direction, to transfer a gate signal. The gate line 21 may include a plurality of gate lines disposed on the first insulating substrate 10 and arranged in parallel with one another. The gate electrode 22 of a TFT that is connected to the gate line 21 forms a protrusion from the gate line 21 by protruding outwardly from the gate line 21 towards an adjacent gate line 21. A storage electrode line (not shown) may be disposed in parallel with the gate line 21, and a storage electrode may extend or protrude from the storage electrode line.

A plurality of gate pads (not shown) is disposed at one ends of the plurality of gate lines. The gate electrode 22 may be formed such that the gate line 22 partially protrudes. The gate line 21 and the gate electrode 22 are collectively referred to as gate wiring lines.

The gate wiring lines 21 and 22 may be made of an aluminum-based metal, such as aluminum (Al) and an aluminum alloy, a silver-based metal, such as silver (Ag) and a silver alloy, a copper-based metal, such as copper (Cu) or a copper alloy, a molybdenum-based metal, such as molybdenum (Mo) and a molybdenum alloy, chromium (Cr), titanium (Ti), or tantalum (Ta). Additionally, the gate wiring lines 21 and 22 may include a single layer of material or may have a multi-layered structure including two conductive layers having different physical properties (not shown). Of the two conductive layers, any one conductive layer is formed of metal having low resistivity, for example, the aluminum-based metal, the silver-based metal, or the copper-based metal, so as to reduce signal delaying or a drop in voltage in the gate wiring lines 21 and 22.

Another conductive layer in a multilayered structure of the gate wiring lines 21 and 22 may be formed of a substance having good contact properties with other material, such as a molybdenum-based metal, chromium, titanium, or tantalum. Exemplary embodiments of a multi-layered structure of the gate wiring lines 21 and 22 include a structure that includes a lower chromium layer and an upper copper layer, or a structure that includes a lower molybdenum layer and an upper titanium layer. However, the present invention is not limited thereto. The gate wiring lines 21 and 22 may be made of various types of metals, and conductors.

A gate insulating layer 30 may be made of silicon nitride ($SiN_x$) to insulate the gate wiring lines 21 and 22 from data wiring lines 62, 65 and 66, which will later be described. The gate insulating layer 30 is disposed at overlapping areas of the gate wiring lines 21 and 22 and the data wiring lines 62, 65 and 66. That is to say, the gate insulating layer 30 is interposed between each of the gate wiring lines 21 and 22 and the data wiring lines 62, 65 and 66.

The gate insulating layer 30 may be blanket-deposited over the first insulating substrate 10, except for portions necessarily to be electrically connected to the gate wiring lines 21 and 22 in a direct contact manner, like a contact hole, for example.

The semiconductor layer 40 made of amorphous silicon ("a-Si") and the ohmic contact layers 55 and 56 made of $n^+$ a-Si hydride, which is doped with n-type impurities at a high concentration are disposed over the gate insulating layer 30. The semiconductor layer 40 forms a channel region of a TFT Q. That is, the channel region is formed by the semiconductor layer 40 overlapping the gate electrode 22. The ohmic contact layers 55 and 56 have substantially the same patterns as the semiconductor layer 40, except for the channel region. The ohmic contact layers 55 and 56 are separated from each other with the channel region disposed on the portion overlapping the gate electrode 22. The ohmic contact layers 55 and 56 are disposed over the semiconductor layer 40.

Meanwhile, the semiconductor layer 40 may have various shapes, such as island shapes or stripe shapes. In the illustrated embodiment, for example, the semiconductor layer 40 may be formed in an island shape.

The source electrode 65 and the drain electrode 66 are disposed on the semiconductor layer 40 and the ohmic contact layers 55 and 56 to be separated from each other by a length of the channel region. The semiconductor layer 40 is disposed on the gate electrode 22. The source electrode 65, the drain electrode 66, the gate electrode 22 and the semiconductor layer 40 constitute a TFT.

The plurality of data lines 62 extends substantially in a longitudinal direction, a second direction substantially perpendicular to the first direction, to cross the plurality of gate lines 21. The plurality of data lines 62 and the plurality of gate lines 21 are arranged in the LCD 1 and a plurality of pixels are arranged in a matrix type amongst the data lines 62 and gate lines 21. Each pixel includes a TFT Q having thee terminals composed of the gate electrode 22, the source electrode 65, and the drain electrode 66.

The source electrode 65 may be provided by partially extending from an upper part of the data line 62, and the drain electrode 66 separated from the source electrode 65 is opposite to the source electrode 65 with respect to the channel region of the TFT. The drain electrode 66 is connected to a pixel electrode 131 through a contact hole 76.

The data line 62, the source electrode 65 and the drain electrode 66 may be made of the same material using the same process. The data line 62, the source electrode 65, and the drain electrode 66 may be formed of at least one material including chrome, molybdenum (Mo), titanium (Ti), chromium (Cr), tungsten (W), and aluminum (Al).

A passivation layer 70 is disposed on the gate insulating layer 30 and the TFT Q. The passivation layer 70 may be formed of, e.g., silicon oxide ($SiO_x$), silicon oxynitride ($SiO_xN_y$), and silicon nitride ($SiN_x$).

Protrusion patterns 82 made of an organic layer and the pixel electrodes 131 are disposed on the passivation layer 70. The pixel electrodes 131 and the common electrode 240 generate an electric field, thereby controlling the refractivity of the liquid crystal layer 4.

The pixel electrodes 131 are disposed on the protrusion patterns 82.

Each of the protrusion patterns 82 is disposed on the passivation layer 70 and protrudes toward the upper display panel 3. The protrusion pattern 82 reduces a driving voltage for driving the blue phase liquid crystals 410. The protrusion pattern 82 may be disposed so as to be tilted with respect to the gate line 21 and the data line 62 to have a serrated cross-sectional shape. The protrusion pattern 82 has a width that is noticeably smaller than its length and may include a plurality of patterns arranged in parallel or substantially in parallel with one another.

Meanwhile, the positional relationship between the protrusion pattern 82 and the gate line 21 and the data line 62 is not limited to the illustrated example in which the protrusion pattern 82 forms a predetermined angle with respect to the gate line 21 and the data line 62. In addition, the protrusion pattern 82 may be disposed in parallel with the gate line 21 or the data line 62. Alternatively, the protrusion pattern 82 may be partially bent in a V-shape.

In an exemplary embodiment, the protrusion pattern 82 may be formed by patterning an organic insulating film or photoresist. The protrusion pattern 82 may be formed to have a height of about 3 μm or greater. The height of the protrusion pattern 82 is inversely proportional to the driving voltage for driving blue phase liquid crystals 410. Accordingly, in order to sufficiently reduce the driving voltage, the height of the protrusion pattern 82 is preferably about 3 μm or greater.

A thickness of a lower portion of the protrusion pattern 82 may be greater than that of a top portion of the protrusion pattern 82.

The protrusion pattern 82 may be formed when curing the organic insulating film.

The pixel electrode 131 is disposed on the protrusion pattern 82. Portions of the pixel electrode 131 are separated from adjacent portions of the pixel electrode 131 with a cutout 133 interposed therebetween. The pixel electrode 131 is configured such that top and lateral portions are disposed on the protrusion pattern 82. The pixel electrode 131 and the common electrode 240 generate an electric field, thereby controlling the refractivity of the liquid crystal layer 4. The pixel electrode 131 includes a top surface 121 and lateral surfaces 126. The pixel electrode 131 may be formed of a transparent electrode made of indium tin oxide ("ITO") or indium zinc oxide ("IZO").

The protrusion pattern 82 protrudes toward the upper part of the passivation layer 70, that is, a longitudinal section of the protrusion pattern 82 may be trapezoidal with a widest portion of the protrusion pattern 82 adjacent to the upper part of the passivation layer 70. The top and lateral portions of the protrusion pattern 82 are surrounded by the pixel electrode 131. That is to say, the top surface 121 of the pixel electrode 131 is disposed on the top portion of the protrusion pattern 82, and the lateral surfaces 126 of the pixel electrode 131 are disposed on the lateral portions of the protrusion pattern 82. The top surface 121 and the lateral surfaces 126 of the pixel electrode 131 may completely wrap the protrusion pattern 82. The lateral surfaces 126 of one portion of the pixel electrode 131 are separated from lateral surfaces of an adjacent portion of the pixel electrode 131 with the cutout 133 interposed therebetween.

A metal pattern 101 is disposed on the top surface 121 of the pixel electrode 131. The metal pattern 101 blocks light incident from a backlight (not shown) and serves as a mask for forming the cutout 133. The metal pattern 101 may include a metal layer.

A thickness of the metal pattern 101 is preferably greater than the upper width of the protrusion pattern 82, and may be formed so as to overlap the top surface 121 of the pixel electrode 131. Since the metal pattern 101 is used as a mask for forming the cutout 133 by patterning the pixel electrode 131, the metal pattern 101 and the cutout 133 are preferably formed so as not to overlap each other. In other words, the boundary of the metal pattern 101 may be substantially coincident with that of the cutout 133. A distance between the metal pattern 101 and the cutout 133 may be about 3 μm or less. In addition, a distance between the metal pattern 101 and an adjacent metal pattern may also be about 3 μm or less.

Here, the cutout 133 may be formed using the metal pattern 101 as an etch mask by a dry etching method, which imparts dielectric anisotropy. Accordingly, portions overlapping the metal pattern 101 are not etched and only portions that are not blocked by the metal pattern 101 can be etched. A method of forming the cutout 133 will later be described in detail.

Meanwhile, the metal pattern 101 blocks light incident from the backlight for preventing light leakage. The blue phase liquid crystals 410 between the neighboring protrusion patterns 82 may control the light used for displaying a screen. But, the light going toward the blue phase liquid crystals 410 positioned right above the protrusion pattern 82 is blocked.

Portions of the pixel electrode 131 are connected to adjacent portions of the pixel electrode 131 by a coupling electrode 132, and the pixel electrode 131 is connected to the drain electrode 66 through the contact hole 76. The coupling electrode 132 is formed along the gate line 21 and the data line 62 so as to surround the pixel electrode 131. The illustrated coupling electrode 132 is only an example. The coupling electrode 132 may be formed by connecting intermediate parts of the neighboring portions of the pixel electrode 131 or one ends of the neighboring portions of the pixel electrode 131.

Alternatively, the coupling electrode 132 may be disposed directly on the passivation layer 70, or may be formed on separate protrusion patterns.

The upper display panel 3 is disposed to face the lower display panel 2. The upper display panel 3 includes black matrices 220, color filters 230 and a common electrode 240.

The black matrices 220 for preventing light leakage are disposed on a second insulating substrate 210. The black matrices 220 are disposed so as to overlap the TFT Q, forming a boundary with adjacent pixels. The color filters 230 may be disposed in pixel areas between the black matrices 220, and the common electrode 240 is disposed on the black matrices 220 and the color filters 230. The common electrode 240 is provided over the entire surface, or substantially the entire surface, of the second insulating substrate 210. In the illustrated embodiment, the black matrices 220, the color filters 230 and the common electrode 240 are disposed on the second insulating substrate 210. However, the black matrices 220, the color filters 230 and the common electrode 240 may be disposed on the first insulating substrate 10.

The liquid crystal layer 4 is interposed between the lower display panel 2 and the upper display panel 3.

Hereinafter, the liquid crystal layer 4 including blue phase liquid crystals will be described in detail with reference to FIGS. 3A and 3B.

Each blue phase liquid crystal 410 has a blue-phase that appears in a temperature region between a chiral nematic phase and an isotropic phase. The liquid crystal layer 4 is optically isotropic when no external field is applied thereto, while it is optically anisotropic when the external field is applied thereto. The orientation of general liquid crystals is varied as the external field is applied, which changes the refractive index of the liquid crystals with directivity. The refractive index of the general liquid crystals, that is, the liquid crystals without directivity, is not changed. However, the blue phase liquid crystal 410 are characteristic in that they become optically anisotropic when an external field is applied thereto, changing the refractive index thereof.

The blue phase liquid crystal 410 has a polymer-network structure formed by polymerizing liquid crystal substance, monomers, and a crosslinking agent. In this way, a temperature range in which a blue phase is demonstrated can be expanded, and a response speed of liquid crystals can be increased. Here, examples of the monomers useful for forming the polymer-network structure include acrylate monomers such as an acryloid group, a methacryloid group, or the like.

Referring to FIG. 3A, the blue phase liquid crystal 410 have a set of a plurality of liquid crystal molecules 412 which are twisted along X and Y axes, respectively. The liquid crystal molecules 412 twisted along X and Y axes are perpendicular to each other with respect to the Z axis. The structure of the liquid crystal molecules 412 is defined as a double twist cylinder structure. The blue phase liquid crystal 410 having the double twist cylinder structure forms a cylindrical shape in the Z axis. The liquid crystal molecules 412 have directivity in the double twist cylinder structure.

Referring to FIG. 3B, the blue phase liquid crystal 410 having a cubic lattice structure are arranged to form the liquid crystal layer 4 having a body centered cubic structure, maintaining an optically isotropic property. However, when a voltage is applied to an isotropic substance having a polarity, the optically isotropic property changes in proportion to the square of the voltage applied, and such an optical effect in which the refractive index increases is defined as a Kerr effect.

In principle, the blue phase liquid crystal 410 has an optically isotropic property. However, when a voltage is applied to the blue phase liquid crystal 410, the optical property of the blue phase liquid crystal 410 is rapidly changed into anisotropy, thereby controlling the light transmittance of the liquid crystal layer 4 having directivity. A display device having a high response speed and a wide viewing angle can be attained using the blue phase liquid crystal 410.

Hereinafter, an exemplary method of fabricating an exemplary LCD according to an exemplary embodiment of the present invention will be described with reference to FIGS. 4 through 15. FIGS. 4 through 15 are cross-sectional views showing sequentially the process of an exemplary method of fabricating an exemplary LCD according to an exemplary embodiment of the present invention.

Referring to FIG. 4, the gate line (21 of FIG. 1) and the gate electrode 22 are disposed on the first insulating substrate 10. In detail, a gate metal layer is deposited on the first insulating substrate 10 using a sputtering process, and photolithography is performed to form the gate line gate line 21 and the gate electrode 22.

Referring to FIG. 5, a gate insulating layer 30 made of silicon nitride ($SiN_x$) is disposed on the resultant structure having the gate line 21 and the gate electrode 22. The gate insulating layer 30 is blanket-deposited over the first insulating substrate 10, and on the gate line 21 and the gate electrode 22.

Then, a first amorphous silicon ("a-Si") layer made of hydrogenated a-Si and a second a-Si layer made of silicide or n+ hydrogenated a-Si heavily doped with n type impurity are sequentially stacked on the gate insulating layer 30. The stacking of the first and second a-Si layers may be formed by, for example, chemical vapor deposition ("CVD").

Next, the gate insulating layer 30, the first a-Si layer, and the second a-Si layer are photolithographically etched to form a semiconductor layer 40 and an a-Si pattern 50. In detail, the first and second a-Si layers are photolithographically etched for removal, except for areas for forming active layers on the gate electrode 22 of each pixel. The first a-Si layer is photolithographically etched to form the semiconductor layer 40. The second a-Si layer is photolithographically etched to form the a-Si pattern 50.

The first a-Si layer and the second a-Si layer are etched by, for example, dry etching. The semiconductor layer 40 and the a-Si pattern 50 may be etched simultaneously or independently.

Referring to FIG. 6, a data conductive layer is deposited on the gate insulating layer 30, the semiconductor layer 40 and the a-Si pattern (50 of FIG. 5) resulting from the structure shown in FIG. 5.

The data conductive layer is photolithographically etched to form the source electrode 65, the drain electrode 66 and the data line (62 of FIG. 1). Here, the a-Si pattern 50 between the source electrode 65 and the drain electrode 66 is etched to form a channel region of the TFT.

Referring to FIG. 7, a material for forming a passivation layer is deposited on the entire surface of the resultant structure of FIG. 6. The passivation layer forming material may be, e.g., silicon oxide ($SiO_x$), silicon oxynitride ($SiO_xN_y$), and silicon nitride ($SiN_x$).

The contact hole 76 is formed by etching the passivation layer forming material, thereby forming the passivation layer 70. The passivation layer 70 planarizes the overall step heights of the structures disposed on the first insulating substrate 10.

Referring to FIG. 8, an organic insulating film 80 is deposited on the passivation layer 70 of the resultant structure shown in FIG. 7 to a predetermined thickness. Here, the height of the organic insulating film 80 deposited is preferably at least about 3 μm.

After the depositing process, the organic insulating film 80 may be subjected to only a baking process without additional exposing and developing processes.

Referring to FIG. 9, a first transparent electrode layer 90 is disposed on the organic insulating film 80 shown in FIG. 8. Here, the first transparent electrode layer 90 may be formed of ITO or IZO by sputtering.

Figure 10:
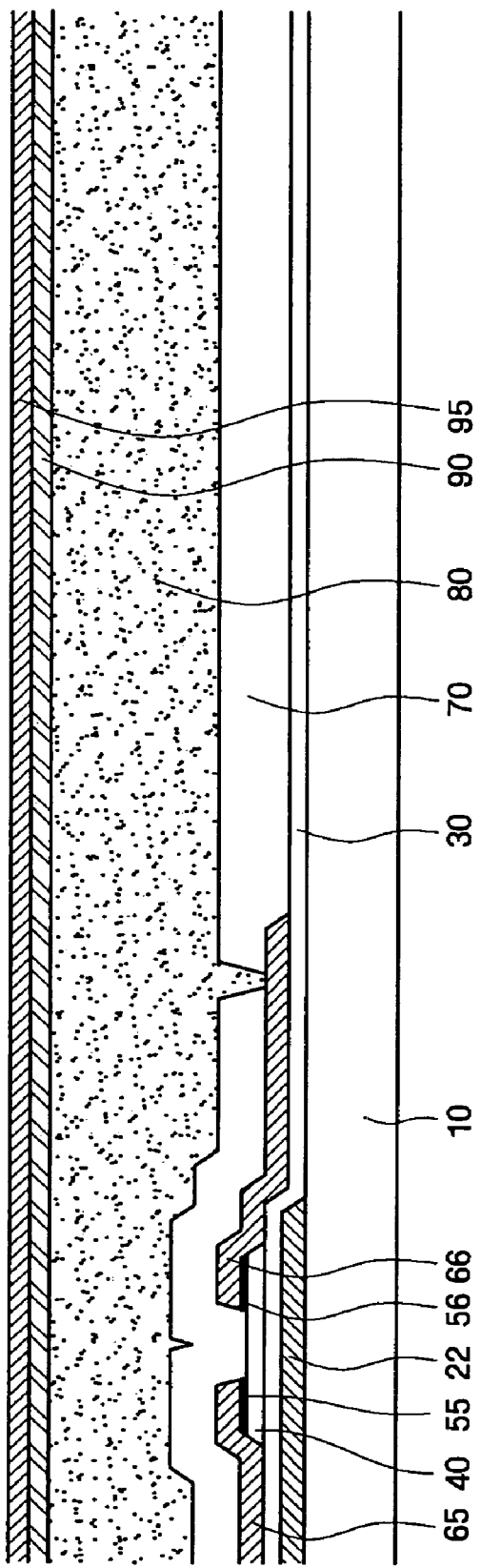

Referring to FIG. 10, a metal layer 95 for forming a metal pattern is disposed on the first transparent electrode layer 90 shown in FIG. 9. The metal layer 95 may be formed by sputtering using an opaque metal layer.

Figure 11:
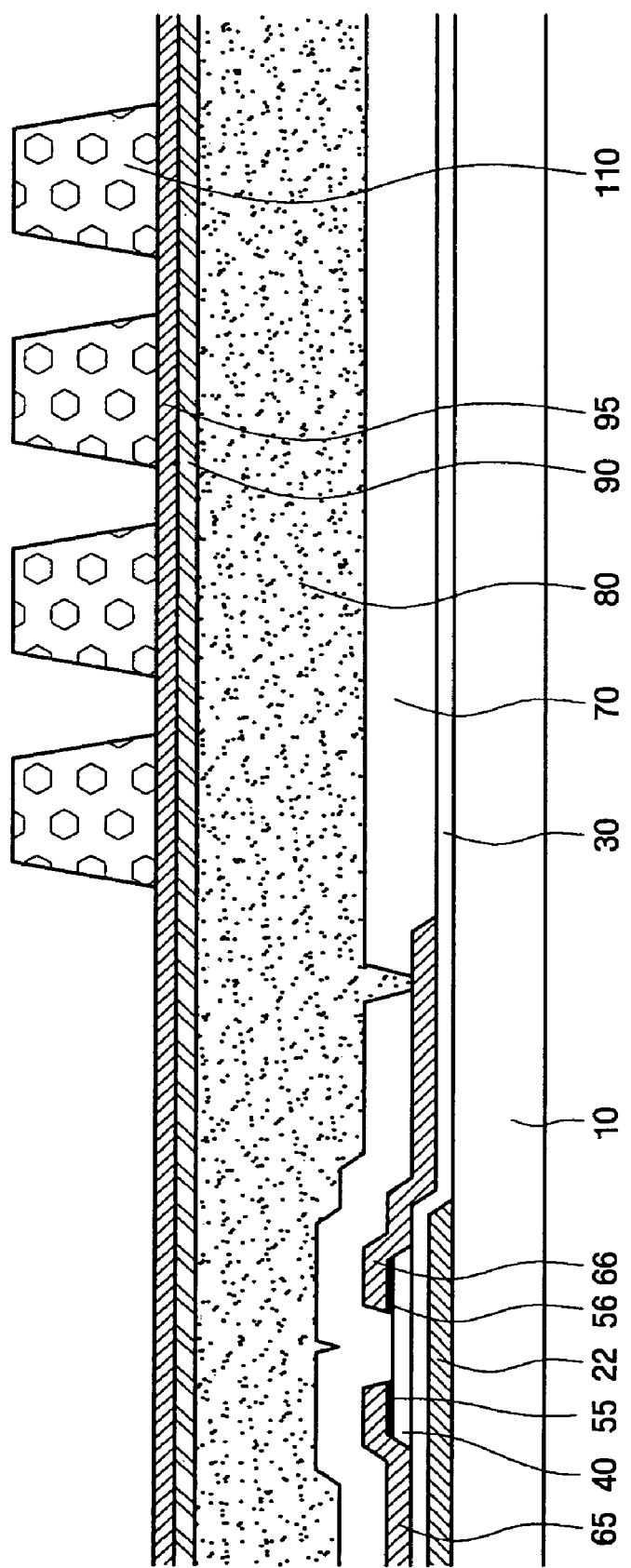

Referring to FIG. 11, photoresist patterns 110 are disposed on the metal layer 95 shown in FIG. 10. The photoresist patterns 110 are used as etch masks for forming the metal pattern (101 of FIG. 2) and the protrusion pattern (82 of FIG. 2), and are disposed on areas for forming the metal pattern 101 and the protrusion pattern 82.

Referring to FIG. 12, the first transparent electrode layer 90 and the metal layer 95 are patterned using the photoresist patterns 110 as the etch masks, thereby forming the pixel electrode pattern 91 and the metal pattern 101.

The first transparent electrode layer 90 and the metal layer 95 may be etched by a dry etching or wet etching process.

Referring to FIG. 13, the protrusion pattern 82 is formed by performing an ashing process on the resultant structure of FIG. 12. That is, the organic insulating film (80 of FIG. 12) is partially removed through the ashing process, thereby forming the protrusion pattern 82, and the photoresist pattern (110 of FIG. 12) is completely removed from the metal pattern 101.

Since the organic insulating film 80 is ashed before a curing process is performed, the ashing process is rapidly performed. Thus, the protrusion pattern 82 can be shaped in a column having a narrower width than that of the metal pattern 101 or the pixel electrode pattern 91. The protrusion pattern 82 formed after performing the ashing process may have substantially the same width at its upper and lower portions.

Next, the protrusion pattern 82 is cured. The curing process is performed by heating at a high temperature or irradiating UV. During the curing process, the protrusion pattern 82 made of an organic material is solidified. Here, the protrusion pattern 82 is shaped in the form of a protrusion having a small width and a long height. As the curing process progresses, some of the organic material moves downward, so that the protrusion pattern 82 may have different widths at its upper and lower portions. That is to say, the width of the lower portion of the protrusion pattern 82 closer to the passivation layer 70 becomes greater than the width of the upper portion of the protrusion pattern 82, and the lateral portions of the protrusion pattern 82 may be formed so as to be inclined.

The protrusion pattern 82 has an inclined lateral surface, and is given structural rigidity after the curing process is completed.

Referring to FIG. 14, a second transparent electrode layer 120 is disposed on the protrusion pattern 82 and the metal pattern 101, in the resultant structure shown in FIG. 13. The second transparent electrode layer 120 may be disposed on the entire surface of the passivation layer 70, the protrusion pattern 82 and the metal pattern 101. Here, the second transparent electrode layer 120 may be made of the same materials as the pixel electrode pattern (91 of FIG. 13). Thus, the pixel electrode pattern 91 may be integrally formed with the second transparent electrode layer 120.

Here, the second transparent electrode layer 120 may be formed to wrap both the top surface of the metal pattern 101 and the lateral portions of the protrusion pattern 82.

Referring to FIG. 15, the second transparent electrode layer 120 resulting from the process of FIG. 14 is etched to form the pixel electrode 131. Here, the second transparent electrode layer 120 may be anisotropically etched. Specifically, the second transparent electrode layer 120 is patterned by dry etching, the second transparent electrode layer 120 present on the top surface of the metal pattern 101 is completely etched away. In addition, the second transparent electrode layer 120 present on the lateral portions of the metal pattern 101 may also be exposed and etched.

On the other hand, the lateral surfaces 126 of the pixel electrode 131 present on the lateral portions of the protrusion pattern 82 remain unetched because they are protected by the metal pattern 101. Since the lateral surfaces 126 of the pixel electrode 131 are positioned inside tip areas of the metal pattern 101, and within a footprint or projection of the metal pattern 101, they remain unetched, which is possible due to the characteristic of dry etching, in which the top portion is not exposed in a vertical direction.

In an area between the protrusion pattern 82 and the adjacent protrusion pattern 82, an exposed portion of the second transparent electrode layer 120, which is not blocked by the metal pattern 101, is patterned, thereby forming the cutout 133. The cutout 133 may be formed to have a width of about 3 μm or less. Accordingly, the pixel electrode 131 formed to surround the protrusion pattern 82 has the top surface 121 disposed on the top portion of the protrusion pattern 82 and the lateral surfaces 126 disposed on the lateral surfaces of the protrusion pattern 82.

Finally, referring back to FIG. 2, the upper display panel 3 is disposed to face the lower display panel 2 shown in FIG. 15, and the liquid crystal layer 4 is interposed between the upper display panel 3 and the lower display panel 2, thereby completing the LCD according to the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A liquid crystal display comprising:
   a first insulating substrate;
   protrusion patterns spaced apart from each other on the first insulating substrate;
   pixel electrodes disposed on the protrusion patterns and having a cutout between the protrusion patterns;

metal patterns disposed directly on the pixel electrodes and overlapping entire top surfaces of the protrusion patterns, a boundary of the metal patterns substantially coincident with that of the cutout;

a second insulating substrate facing the first insulating substrate; and a liquid crystal layer interposed between the first insulating substrate and the second insulating substrate.

2. The liquid crystal display of claim 1, wherein the liquid crystal layer is optically isotropic when no external field is applied thereto, while it is optically anisotropic when the external field is applied thereto, and a refractive index thereof is changed according to an intensity of an electric field applied thereto.

3. The liquid crystal display of claim 2, wherein the liquid crystal layer includes blue phase liquid crystals.

4. The liquid crystal display of claim 2, wherein the liquid crystal layer includes a monomer polymerized with liquid crystals.

5. The liquid crystal display of claim 1, wherein the cutout is patterned using the metal patterns as a mask.

6. The liquid crystal display of claim 5, wherein a metal pattern of the metal patterns has a width greater than an upper width of a corresponding protrusion pattern of the protrusion patterns.

7. The liquid crystal display of claim 1, wherein a portion of the pixel electrodes includes a top surface disposed on the top surface of a corresponding protrusion pattern of the protrusion patterns, and lateral surfaces disposed on lateral surfaces of the corresponding protrusion pattern.

8. The liquid crystal display of claim 7, wherein the lateral surfaces of the corresponding protrusion pattern are inclined.

9. The liquid crystal display of claim 7, wherein the corresponding protrusion pattern has a height of about 3 µm or greater.

10. The liquid crystal display of claim 7, wherein the cutout has a width of about 3 µm or less.

11. The liquid crystal display of claim 1, wherein the protrusion patterns are disposed in parallel with one another in one direction.

12. The liquid crystal display of claim 1, wherein the metal patterns are disposed only on the top surfaces of the protrusion patterns.

13. A method for fabricating a liquid crystal display, the method comprising:

disposing protrusion patterns spaced apart from each other on a first insulating substrate;

disposing pixel electrodes on the protrusion patterns and having a cutout between the protrusion patterns; and disposing metal patterns directly on the pixel electrodes and overlapping entire top surfaces of the protrusion patterns, a boundary of the metal patterns substantially coincident with that of the cutout.

14. The method of claim 13, wherein disposing the protrusion patterns comprises disposing an organic insulating film for forming protrusions on the first insulating substrate, and patterning the organic insulating film.

15. The method of claim 14, wherein disposing the metal patterns comprises disposing a metal layer for forming the metal patterns on the organic insulating film, and patterning the metal layer.

16. The method of claim 15, further comprising disposing a first transparent electrode layer between the organic insulating film and the metal layer, wherein the first transparent electrode layer is patterned simultaneously with the metal layer.

17. The method of claim 16, wherein a width of each of the metal patterns is greater than an upper width of each of the protrusion patterns.

18. The method of claim 14, wherein disposing the pixel electrodes comprises disposing a first transparent electrode layer between the organic insulating film and the metal layer and disposing a second transparent electrode layer on the protrusion patterns and the metal patterns, and patterning the second transparent electrode layer.

19. The method of claim 18, wherein the cutout is formed by performing anisotropic etching using the metal patterns as etch masks.

20. The method of claim 19, wherein the anisotropic etching is dry etching.

21. The method of claim 13, further comprising providing a second insulating substrate facing the first insulating substrate, and interposing a liquid crystal layer between the first insulating substrate and the second insulating substrate, wherein the liquid crystal layer is optically isotropic when no external field is applied thereto, while it is optically anisotropic when the external field is applied thereto, and a refractive index thereof is changed according to an intensity of an electric field applied thereto.

22. The method of claim 21, wherein the liquid crystal layer includes blue phase liquid crystals.

23. The method of claim 21, further comprising forming the liquid crystal layer by polymerizing a monomer with liquid crystals.

24. The method of claim 13, wherein the metal patterns are disposed only on the top surfaces of the protrusion patterns.

* * * * *